United States Patent
Grant

(10) Patent No.: US 6,408,965 B1
(45) Date of Patent: Jun. 25, 2002

(54) HYDRAULIC TRACK DRIVE WITH HYDRAULIC TRACK TENSIONERS

(76) Inventor: Sonny Grant, P.O. Box 7186, Spanish Fort, AL (US) 36577

( * ) Notice: Subject to any disclaimer, the term of this patent is extended or adjusted under 35 U.S.C. 154(b) by 0 days.

(21) Appl. No.: 09/737,522

(22) Filed: Dec. 14, 2000

(51) Int. Cl.$^7$ ................................................ B62D 55/30
(52) U.S. Cl. ........................ 180/9.62; 180/9.1; 305/145; 305/153
(58) Field of Search ................ 180/9, 9.1, 9.21, 180/9.23, 9.26, 9.44, 9.62, 6.7; 305/143, 145, 146, 153; 474/110

(56) References Cited

U.S. PATENT DOCUMENTS

| | | | | |
|---|---|---|---|---|
| 3,645,586 A | * | 2/1972 | Piepho | 305/146 |
| 3,776,326 A | * | 12/1973 | Davin et al. | 180/9.1 |
| 3,910,649 A | * | 10/1975 | Roskaft | 305/144 |
| 4,458,954 A | * | 7/1984 | Haas | 305/144 |
| RE32,442 E | * | 6/1987 | Satzler | 180/9.1 |
| 4,681,376 A | * | 7/1987 | Riml | 305/146 |
| 4,865,141 A | * | 9/1989 | Gey | 180/9.21 |
| 5,316,381 A | * | 5/1994 | Isaacson et al. | 305/145 |
| 5,361,860 A | * | 11/1994 | Smith et al. | 180/9.21 |
| 6,135,220 A | * | 10/2000 | Gleasman et al. | 180/9.1 |
| 6,249,994 B1 | * | 6/2001 | Oertley | 180/9.1 X |

FOREIGN PATENT DOCUMENTS

JP 60-104472 * 6/1985

* cited by examiner

Primary Examiner—J. J. Swann
Assistant Examiner—F. Zeender
(74) Attorney, Agent, or Firm—Joseph N. Breaux

(57) ABSTRACT

A light weight track drive mechanism that provides a large track drive surface area while maintaining a low weight to track contact surface area ratio so that the track drive could operate on soils with low support qualities. In addition, the track drive system is provided with high ground clearance so that fewer obstacles may prevent the track drive from moving around as needed.

1 Claim, 7 Drawing Sheets

US 6,408,965 B1

HYDRAULIC TRACK DRIVE WITH HYDRAULIC TRACK TENSIONERS

TECHNICAL FIELD

The present invention relates to track drives for heavy equipment used in off road areas for performing work in agricultural, logging and oil field areas and more particularly to hydraulic track drive with hydraulic track tensioners that includes a drive chassis including a cab support structure and left and right sets of plurality of pairs of free-wheeling pneumatic tires rotatably mounted, respectively to, left and right wheel structures of the drive chassis; left and right loops of drive track; a housing assembly; left and right hydraulic motors; left and right drive sprockets; left and right drive hydraulic pumps; left and right drive control valving; left and right track tensioner assemblies; tension control valving; a tensioner assembly hydraulic pump; left and right chain guides and a pump drive motor for driving the tensioner assembly hydraulic pump and the left and right hydraulic motors; the left and right loops of drive track each being moveably entrapped around respectively, a left or a right set of the plurality of pairs of free-wheeling pneumatic tires, a left or a right chain guide and a respective left or right drive sprocket; each of the left and right loops of drive track having an inwardly facing track drive track chain along the entire length thereof; each pair of free-wheeling pneumatic tires having an inner pneumatic tire and an outer pneumatic tire between which a drive track chain gap is provided; each drive track chain gap of each pair of free-wheeling pneumatic tires being in alignment with each of the drive track chain gaps of its respective set such that a track drive track chain passageway is formed therebetween for passage of the track drive track chain of the respective loop of drive track; each of the chain guides being supported by the drive chassis above its respective track drive track chain passageway; a respective left or right sprocket each being in alignment with its respective track drive track chain passageway and meshed with its respective track drive track chain of its respective loop of drive track such that rotation of the respective left or right sprocket causes a movement of the respective loop of drive track and the respective set of the plurality of pairs of free-wheeling pneumatic tires; the housing assembly having the left and right hydraulic motors housed within respective left and right ends thereof, hydraulic lines in connection with the left and right hydraulic motors extending from the housing assembly and in connection with the left and right drive control valving and the left and right hydraulic pumps such that an operator can control the speed and direction of each of the left and right hydraulic motors; the left and right sprockets being driven, respectively, by a left or right hydraulic motor; the housing assembly being moveably coupled to the drive chassis by spaced left and right slide members each slidably supported within one of two spaced slide member receiving tubes by a pair of resilient bushings; each slide member receiving tube being in a rigidly supported position with respect to the drive chassis; the left and right track tensioner assemblies each including a respective left or right double acting hydraulic cylinder mechanically coupled between the drive chassis and an exterior of the housing assembly such that the housing assembly is moveable in all three planes with respect to each of the left or right double acting hydraulic cylinders; the left or right double acting hydraulic cylinders each being in hydraulic connection with the tension control valving and the tensioner assembly hydraulic pump such that an operator can adjust the tension applied to a respective left or right loop of drive track by the respective left and right sprocket by operation of the tension control valving; the tension control valving, the left and right drive control valving, the tensioner assembly hydraulic pump, the left and right hydraulic pumps, and the hydraulic pump drive motor being supported by the drive chassis.

BACKGROUND ART

It is difficult for heavy equipment to be used in remote unpaved areas such as agricultural fields, logging sites, oil well drilling locations, marshes, power line right of ways, etc. because of the inability of the soils in these areas to provide sufficient support the weight of the heavy equipment. This occurs because the heavy equipment typically has a drive mechanism, such as a track drive or tires, that does not have sufficient soil surface contact area to spread the weight of the equipment over enough area of the soil surface to allow the soil to support the piece of heavy equipment sufficiently to allow the piece of heavy equipment to operate. What is needed, therefore, is a track drive mechanism that provides a large track drive surface area while maintaining a low weight to track contact surface area ratio so that the track drive could operate on soils with low support qualities. It would also be desirable to provide a simple to maintain and inexpensive to assemble track drive system. In addition, because large obstacles such as logs, rocks, etc. may limit the movement of a track drive, it would be a benefit to have a track drive system with high ground clearance so that fewer obstacles would prevent the track drive from moving around as needed.

GENERAL SUMMARY DISCUSSION OF INVENTION

It is thus an object of the invention to provide a hydraulic track drive with hydraulic track tensioners that includes a drive chassis including a cab support structure and left and right sets of plurality of pairs of free-wheeling pneumatic tires rotatably mounted, respectively to, left and right wheel structures of the drive chassis; left and right loops of drive track; a housing assembly; left and right hydraulic motors; left and right drive sprockets; left and right drive hydraulic pumps; left and right drive control valving; left and right track tensioner assemblies; tension control valving; a tensioner assembly hydraulic pump; left and right chain guides and a pump drive motor for driving the tensioner assembly hydraulic pump and the left and right hydraulic motors; the left and right loops of drive track each being moveably entrapped around respectively, a left or a right set of the plurality of pairs of free-wheeling pneumatic tires, a left or a right chain guide and a respective left or right drive sprocket; each of the left and right loops of drive track having an inwardly facing track drive track chain along the entire length thereof; each pair of free-wheeling pneumatic tires having an inner pneumatic tire and an outer pneumatic tire between which a drive track chain gap is provided; each drive track chain gap of each pair of free-wheeling pneumatic tires being in alignment with each of the drive track chain gaps of its respective set such that a track drive track chain passageway is formed therebetween for passage of the track drive track chain of the respective loop of drive track; each of the chain guides being supported by the drive chassis above its respective track drive track chain passageway; a respective left or right sprocket each being in alignment with its respective track drive track chain passageway and meshed with its respective track drive track chain of its respective loop of drive track such that rotation of the respective left or right sprocket causes a movement of the respective loop of drive track and the respective set of the plurality of pairs of free-wheeling pneumatic tires; the housing assembly having the left and right hydraulic motors housed within respective left and right ends thereof, hydraulic lines in connection with the left and right hydraulic motors extending from the housing assembly and in connection with the left and right drive control valving and the left and right hydraulic pumps such that an operator can control the speed and direction of each of the left and right hydraulic motors; the left and right sprockets being driven, respectively, by a left or right hydraulic motor; the housing assembly being moveably coupled to the drive chassis by spaced left and right slide members each slidably supported within one of two spaced slide member receiving tubes by a pair of resilient bushings; each slide member receiving tube being in a rigidly supported position with respect to the drive chassis; the left and right track tensioner assemblies each including a respective left or right double acting hydraulic cylinder mechanically coupled between the drive chassis and an exterior of the housing assembly such that the housing assembly is moveable in all three planes with respect to each of the left or right double acting hydraulic cylinders; the left or right double acting hydraulic cylinders each being in hydraulic connection with the tension control valving and the tensioner assembly hydraulic pump such that an operator can adjust the tension applied to a respective left or right loop of drive track by the respective left and right sprocket by operation of the tension control valving; the tension control valving, the left and right drive control valving, the tensioner assembly hydraulic pump, the left and right hydraulic pumps, and the hydraulic pump drive motor being supported by the drive chassis.

Accordingly, a hydraulic track drive with hydraulic track tensioners is provided. The hydraulic track drive with hydraulic track tensioners includes a drive chassis including a cab support structure and left and right sets of plurality of pairs of free-wheeling pneumatic tires rotatably mounted, respectively to, left and right wheel structures of the drive chassis; left and right loops of drive track; a housing assembly; left and right hydraulic motors; left and right drive sprockets; left and right drive hydraulic pumps; left and right drive control valving; left and right track tensioner assemblies; tension control valving; a tensioner assembly hydraulic pump; left and right chain guides and a pump drive motor for driving the tensioner assembly hydraulic pump and the left and right hydraulic motors; the left and right loops of drive track each being moveably entrapped around respectively, a left or a right set of the plurality of pairs of free-wheeling pneumatic tires, a left or a right chain guide and a respective left or right drive sprocket; each of the left and right loops of drive track having an inwardly facing track drive track chain along the entire length thereof; each pair of free-wheeling pneumatic tires having an inner pneumatic tire and an outer pneumatic tire between which a drive track chain gap is provided; each drive track chain gap of each pair of free-wheeling pneumatic tires being in alignment with each of the drive track chain gaps of its respective set such that a track drive track chain passageway is formed there between for passage of the track drive track chain of the respective loop of drive track; each of the chain guides being supported by the drive chassis above its respective track drive track chain passageway; a respective left or right sprocket each being in alignment with its respective track drive track chain passageway and meshed with its respective track drive track chain of its respective loop of drive track such that rotation of the respective left or right sprocket causes a movement of the respective loop of drive track and the respective set of the plurality of pairs of free-wheeling pneumatic tires; the housing assembly having the left and right hydraulic motors housed within respective left and right ends thereof, hydraulic lines in connection with the left and right hydraulic motors extending from the housing assembly and in connection with the left and right drive control valving and the left and right hydraulic pumps such that an operator can control the speed and direction of each of the left and right hydraulic motors; the left and right sprockets being driven, respectively, by a left or right hydraulic motor; the housing assembly being moveably coupled to the drive chassis by spaced left and right slide members each slidably supported within one of two spaced slide member receiving tubes by a pair of resilient bushings; each slide member receiving tube being in a rigidly supported position with respect to the drive chassis; the left and right track tensioner assemblies each including a respective left or right double acting hydraulic cylinder mechanically coupled between the drive chassis and an exterior of the housing assembly such that the housing assembly is moveable in all three planes with respect to each of the left or right double acting hydraulic cylinders; the left or right double acting hydraulic cylinders each being in hydraulic connection with the tension control valving and the tensioner assembly hydraulic pump such that an operator can adjust the tension applied to a respective left or right loop of drive track by the respective left and right sprocket by operation of the tension control valving; the tension control valving, the left and right drive control valving, the tensioner assembly hydraulic pump, the left and right hydraulic pumps, and the hydraulic pump drive motor being supported by the drive chassis.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
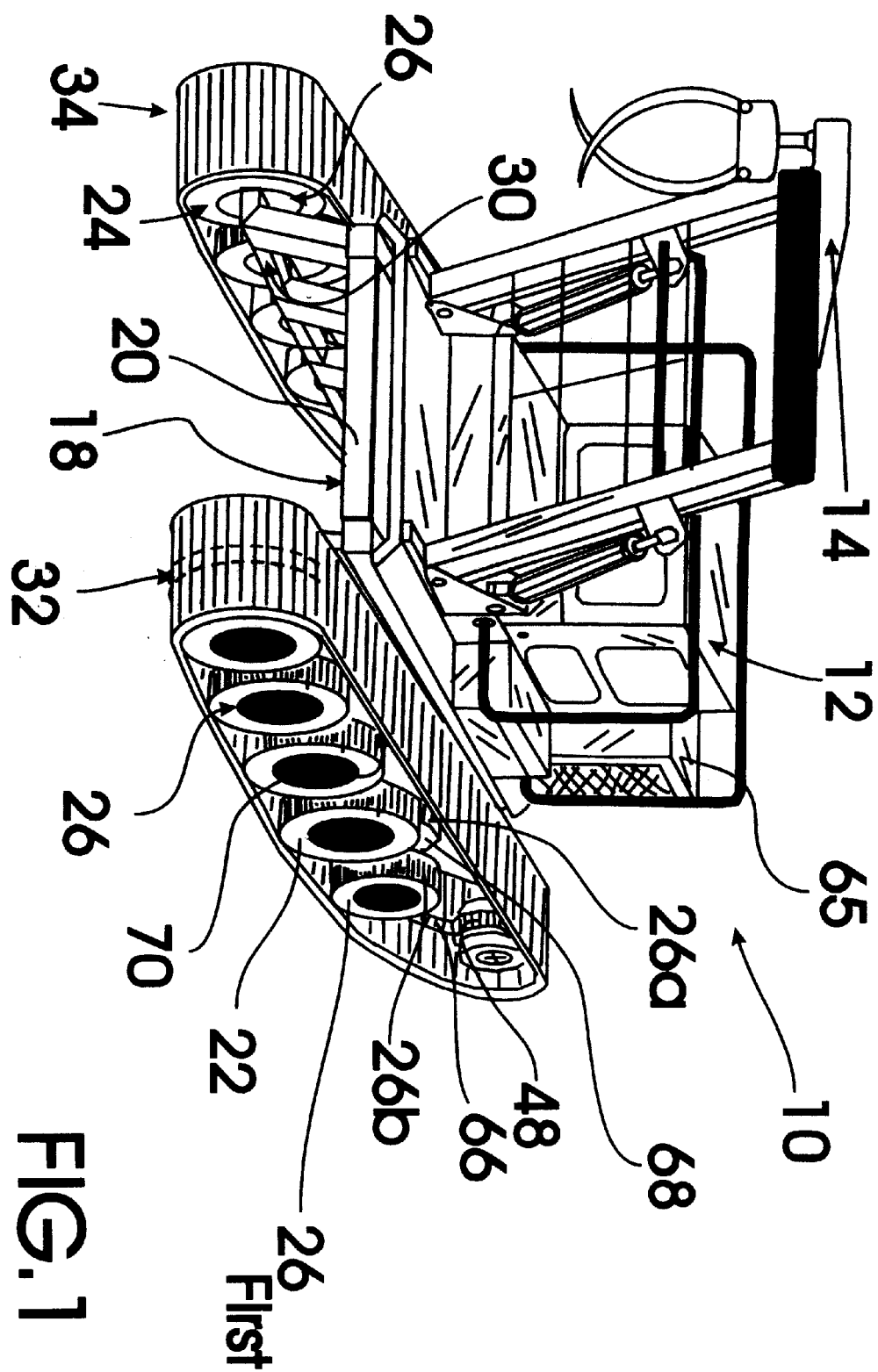
FIG. 1 is a perspective view of an exemplary embodiment of the hydraulic track drive of the present invention with a grapple and driver housing mounted thereon and the left and right sets of plurality of pairs of free-wheeling pneumatic tires rotatably mounted to the drive chassis and the left and right loops of drive track each moveably entrapped around respectively, a left or a right set of the plurality of pairs of free-wheeling pneumatic tires and a respective left or right drive sprocket; each of the left and right loops of drive track having an inwardly facing track drive track chain along the entire length thereof; each pair of free-wheeling pneumatic tires having an inner pneumatic tire and an outer pneumatic tire between which a drive track chain gap is provided; each drive track chain gap of each pair of free-wheeling pneumatic tires being in alignment with each of the drive track chain gaps of its respective set such that a track drive track chain passageway is formed therebetween for passage of the track drive track chain of the respective loop of drive track; the respective left or right sprocket being in alignment with its respective track drive track chain passageway and the track drive track chain of its respective loop of drive track such that rotation of the respective left or right sprocket causes a movement of the respective loop of drive track and the respective set of the plurality of pairs of free-wheeling pneumatic tires.
Figure 2:
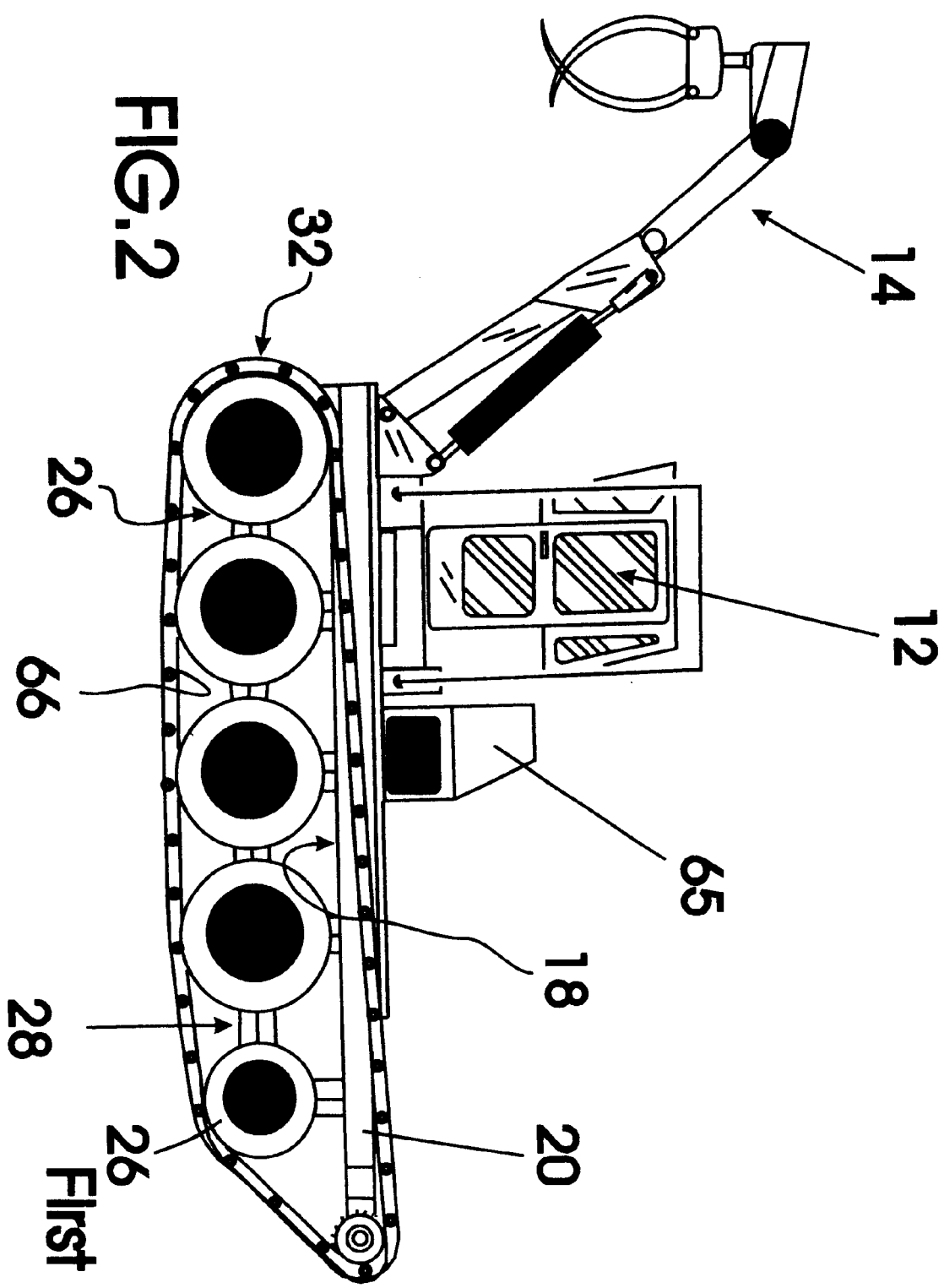
FIG. 2 is a side plan view of the exemplary hydraulic track drive of FIG. 1.
Figure 3:
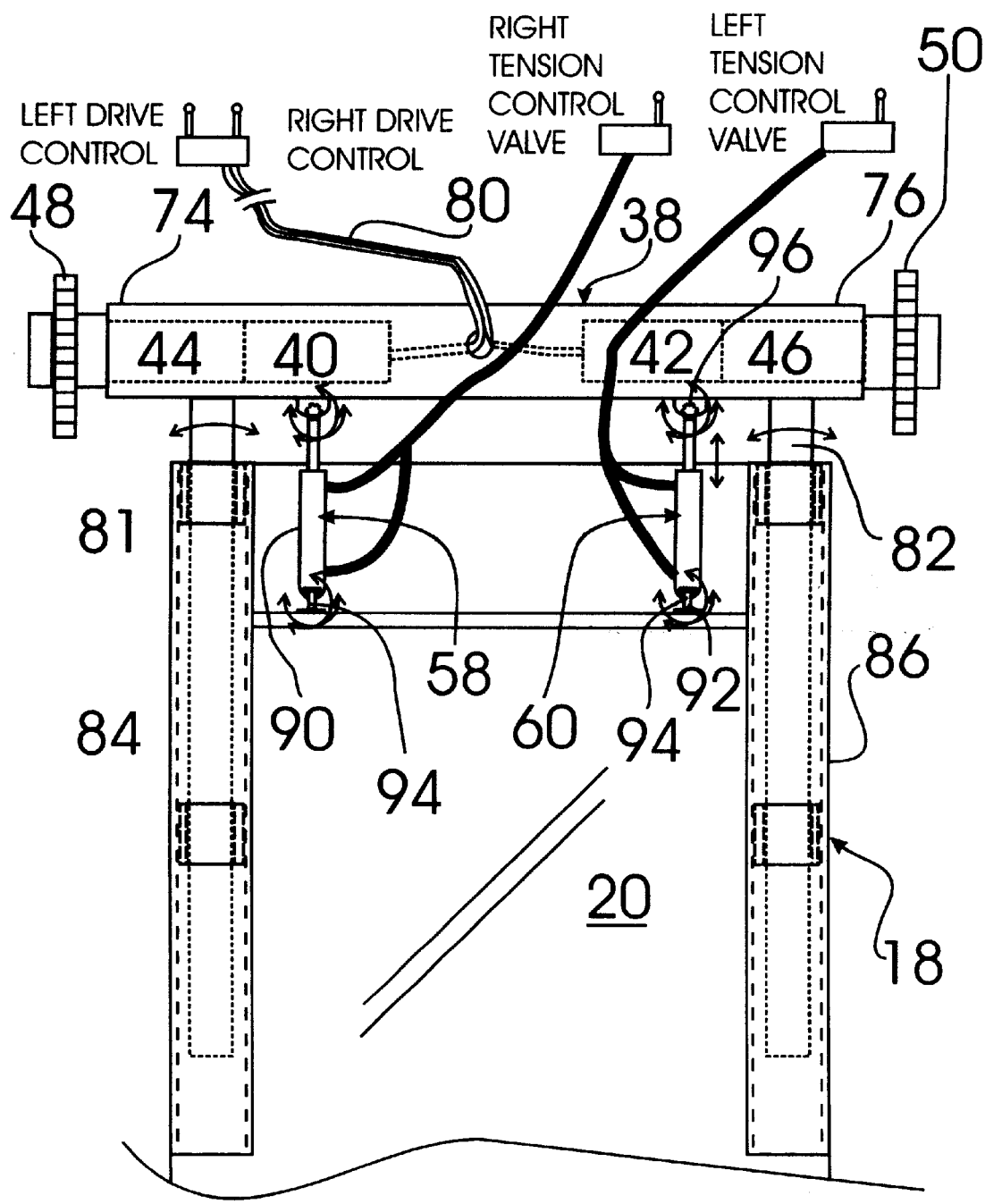
FIG. 3 is an underside partial view of the hydraulic track drive of FIG. 1 showing the housing assembly including left and right hydraulic housed within respective left and right ends of the housing assembly; hydraulic lines in connection with the left and right hydraulic motors extending from the housing assembly and in connection with left and right drive control valving and left and right hydraulic drive pumps such that an operator can control the speed and direction of each of the left and right hydraulic motors; left and right track tensioner assemblies each including a respective left or right double acting hydraulic cylinder mechanically coupled between a cab support structure and an exterior of the housing assembly such that the housing assembly is moveable in all three planes with respect to each of the left or right double acting hydraulic cylinders; the housing assembly being moveably coupled to the cab support by spaced left and right slide members each slidably supported within one of two spaced slide member receiving tubes by a pair of resilient bushings; each slide member receiving tube being rigidly connected to the cab support structure; each of the left and right ends of the housing assembly having a respective shaft of a respective left or right hydraulic motor extending therefrom to which a respective left or right track drive sprocket is attached; the left or right double acting hydraulic cylinders each being in hydraulic connection with tension control valving and a tensioner assembly hydraulic pump such that an operator can adjust the tension applied to the respective loop of drive track by operation of the tension control valving; the left and right drive control valving, the left and right hydraulic drive pumps, the tensioner assembly hydraulic pump, the tension control valving and a hydraulic pump drive motor in driving connection with the tensioner assembly hydraulic pump and the left and right hydraulic drive pumps being supported by the cab support structure.
Figure 4:
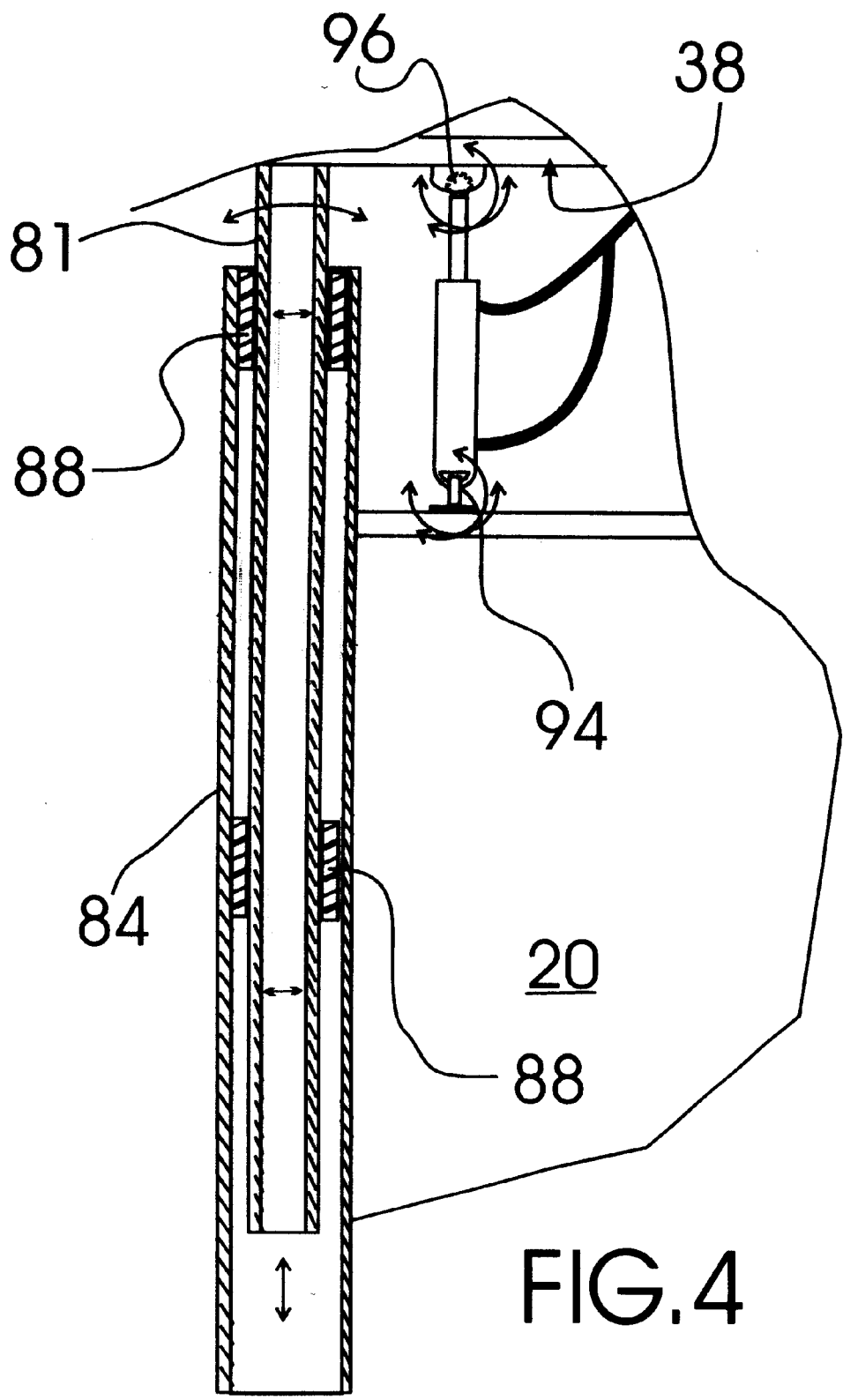
FIG. 4 is a cutaway view showing the right slide member of the housing assembly slidably supported within one of two spaced slide member receiving tubes by the pair of resilient bushings.
Figure 5:
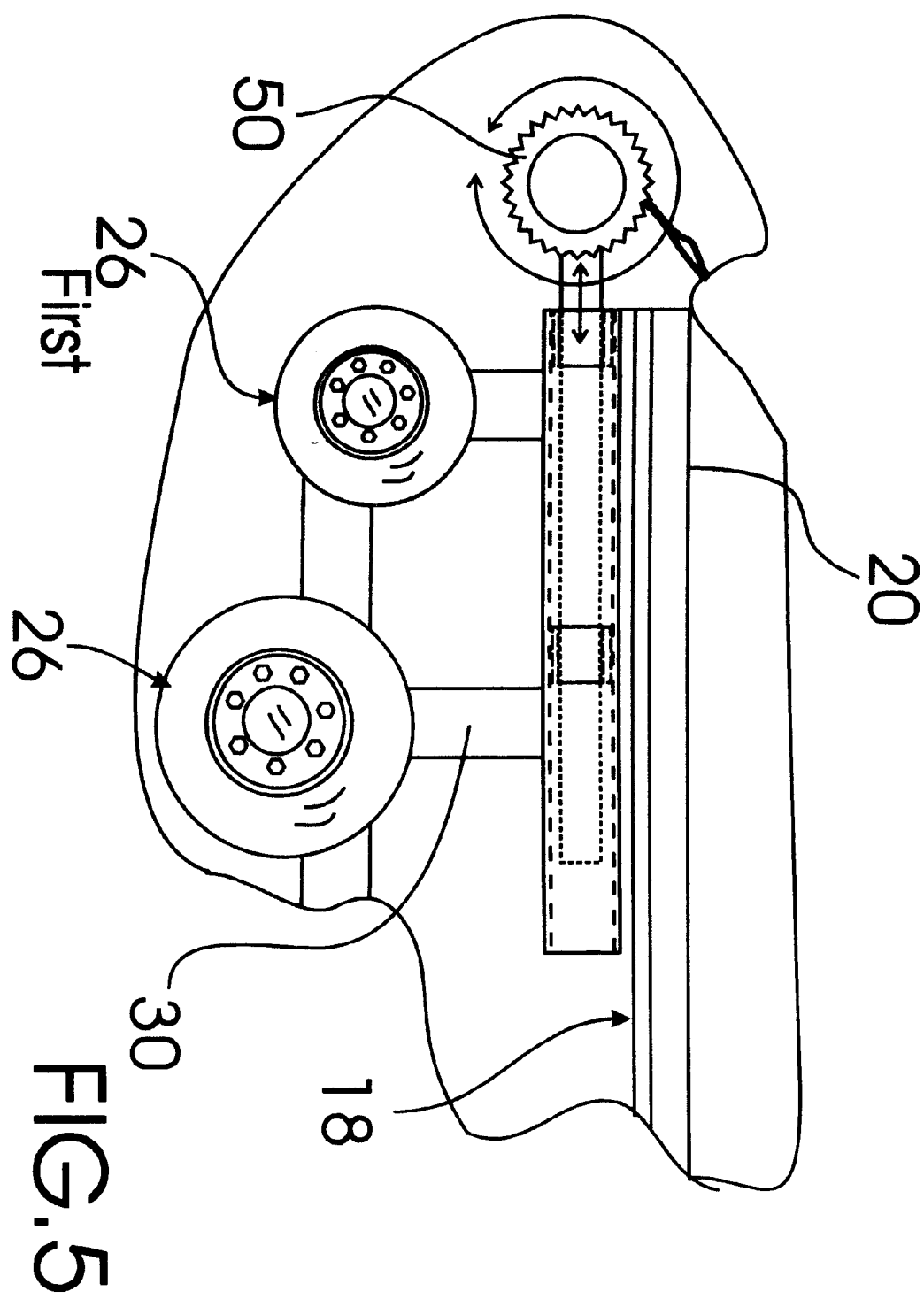
FIG. 5 is a partial quarter view showing one of the drive sprockets and a portion of the cab support structure.
Figure 6:
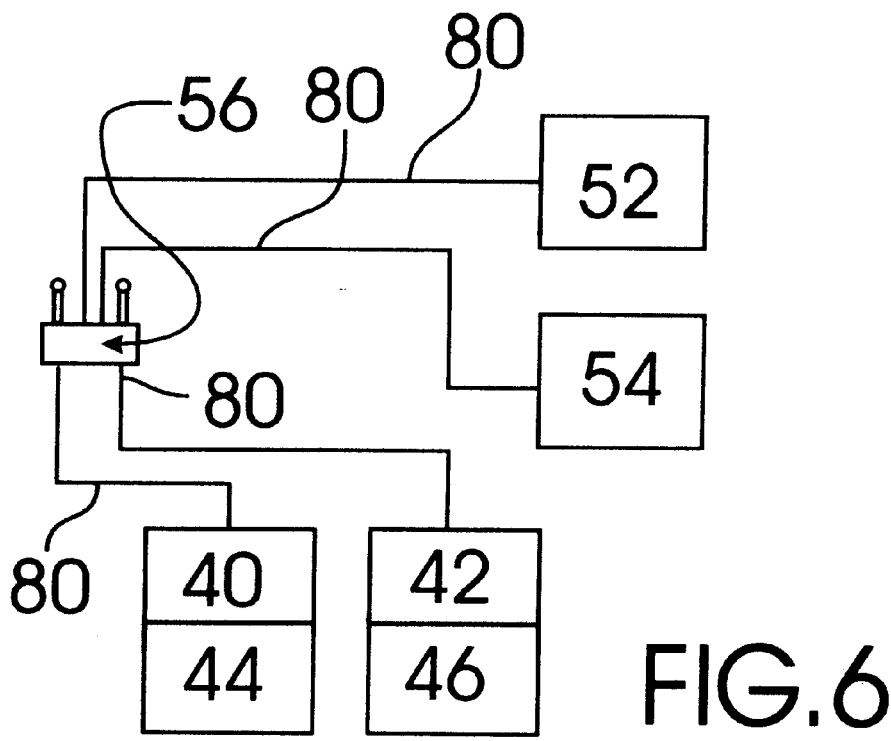
FIG. 6 is a simple schematic diagram showing the left and right hydraulic drive systems.
Figure 7:
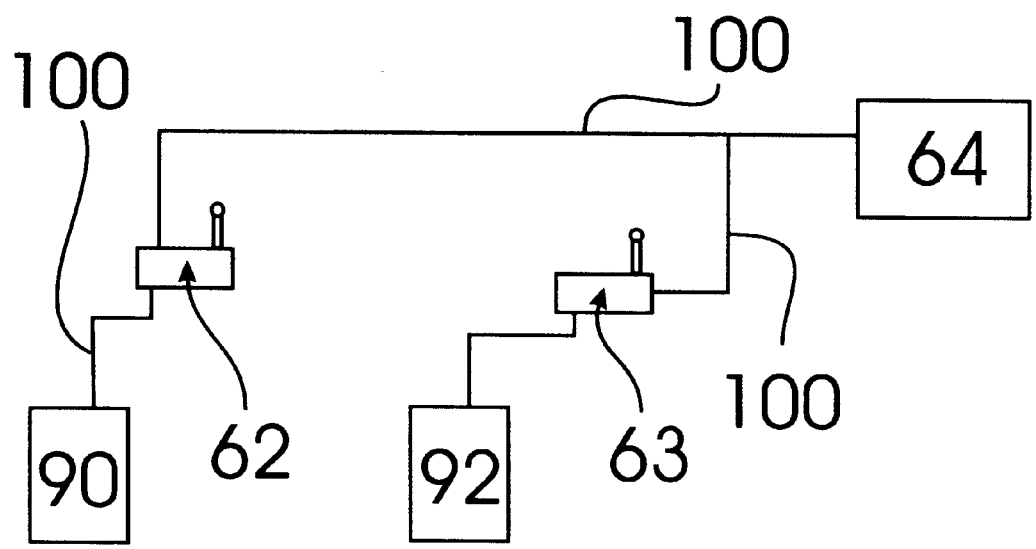
FIG. 7 is a simple schematic showing the left and right track tensioner systems.
Figure 9:
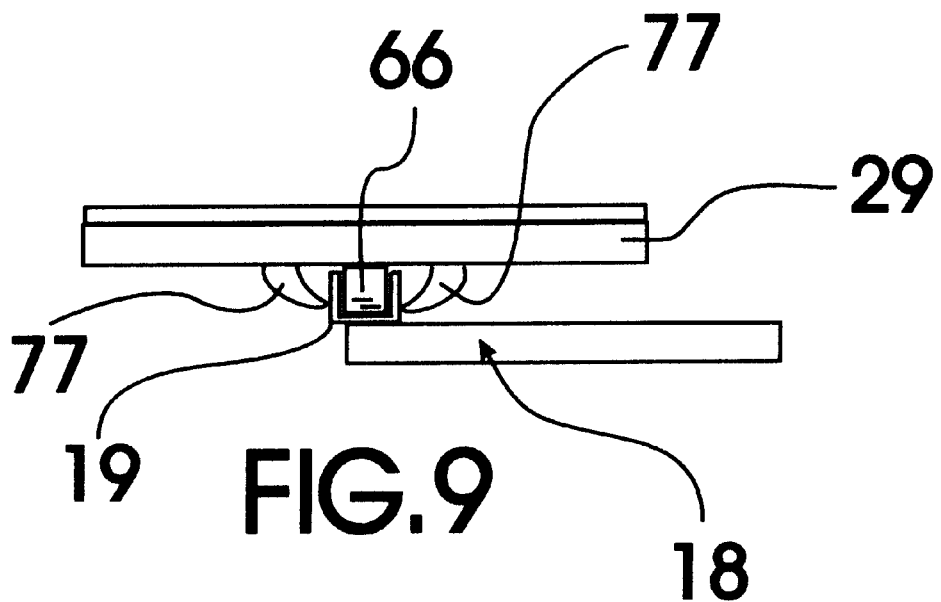
FIG. 9 is a partial plan view showing a section of the chain positioned within one of the left and right chain guides.
Figure 8:
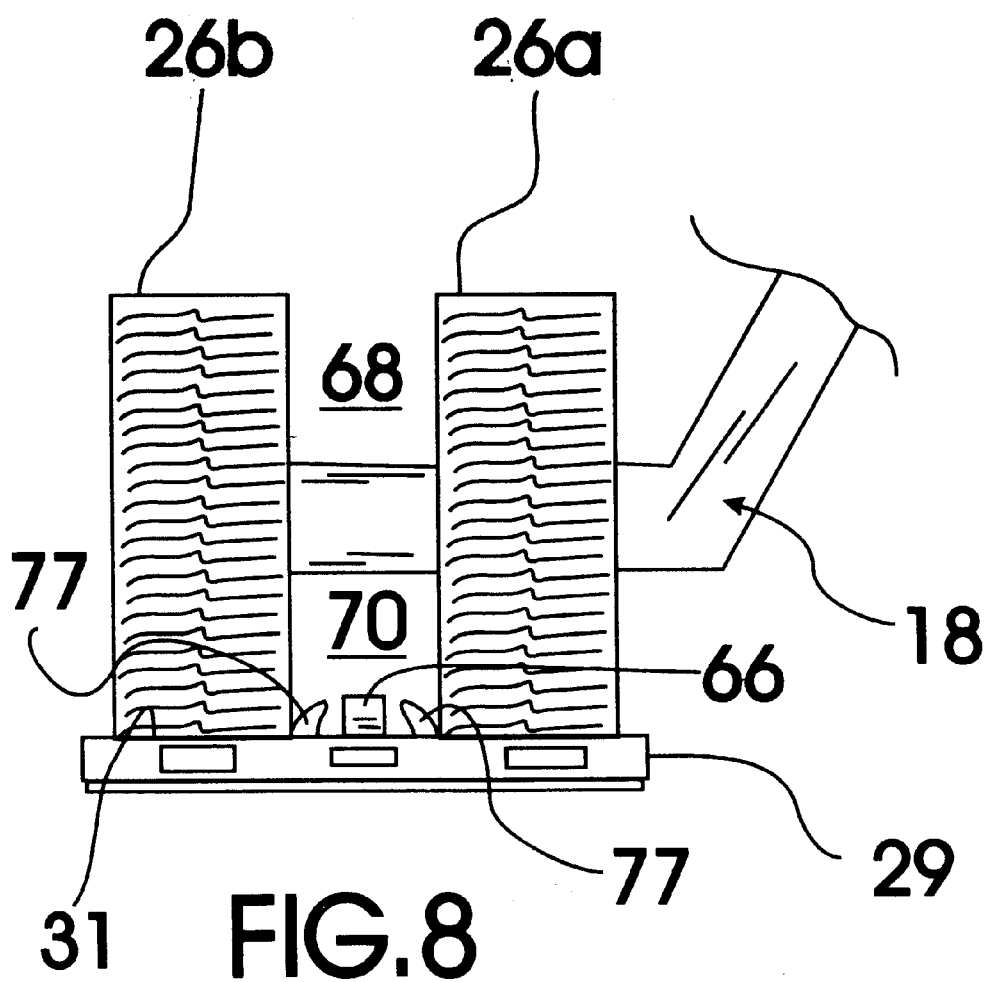
FIG. 8 is a partial plan view showing a section of the chain positioned between the tire guides and within the track drive track chain passageway.

FIGS. 1–9 show various aspects of an exemplary embodiment of the hydraulic track drive with hydraulic track tensioners of the present invention, generally designated 10, along with a representative operator cabin, generally designated 12, and a representative grapple assembly, generally designated 14.

Hydraulic track drive with hydraulic track tensioners of the present invention 10 includes a drive chassis, generally designated 18, including a cab support structure 20 and left and right sets, generally designated 22,24 of five pairs of free-wheeling pneumatic tires, each generally designated 26, rotatably mounted, respectively to, left and right wheel structures 28,30 of drive chassis 18; left and right loops of drive track, generally designated 32,34, that are thirty-six inches wide and provided with outwardly protruding, triple grousers spaced along each track section thereof; left and right chain guides, each designated 19, that are rigidly supported by drive chassis 18 above pneumatic tires 26; a housing assembly, generally designated 38; left and right multiple displacement hydraulic drive motors 40,42; left and right drive sprockets 48,50; left and right torque limiting hydraulic drive pumps 52,54 with torque summation; left and right drive control valving and piping, generally designated 56; left and right track tensioner assemblies, generally designated 58,60; left and right tension control valving and piping, generally designated 62,63; a tensioner assembly hydraulic pump 64; and a pump drive motor 65 for driving the tensioner assembly hydraulic pump 64 and the left and right multiple displacement hydraulic motors 40,42. In this embodiment, pump drive motor 65 is run at a constant speed. Also in this embodiment, each pair of free-wheeling pneumatic tires 26 is a conventional dual rim hub/tire assembly such as those used on the trailer of an 18-wheeler trailer. Further, the cab support structure 20, in this embodiment, is supported at a height of about five feet above the ground surface and the distance between the left and right loops of drive track 32,34 is equal to about fourteen feet.

Left and right loops of drive track 32,34 are each moveably entrapped around respectively, a left or a right set, 22,24 of the five pairs of free-wheeling pneumatic tires 26, a respective left or right guide track 19 and a respective left or right drive sprocket 48,50. Each of the left and right loops of drive track 32,34 is composed of a number of aluminum alloy grouser sections 29 that are pivotally linked to form one of the left and right loops of drive track 32,34 that each have an inwardly facing track drive track chain 66 along the entire length thereof. Each pair of free-wheeling pneumatic tires 26 has an inner pneumatic tire 26a and an outer pneumatic tire 26b between which a drive track chain gap 68 is provided. Each drive track chain gap 70 of each pair of free-wheeling pneumatic tires 26 is in alignment with each of the drive track chain gaps 68 of its respective set 22,24 such that a track drive track chain passageway 70 is formed for passage of the track drive track chain 66 of the respective loop of drive track 32,34. In this embodiment, the tire facing side 31 of each grouser section 29 is provided with a tire guide 77 on either side of the inwardly facing track drive track chain 66 to help maintain moving sections of the inwardly facing track drive track chain 66 within track drive track chain passageway 70 as it passes along through its respective track drive track chain passageway 70. Because of the torsionally rigidity and the tension maintained on the left and right loops of drive track 32, these tire guides 77 are not needed to prevent the left and right loops of drive track 32,34 from derailing under normal use and situations. However, they are provided in this exemplary embodiment because it is believed they would add additional forces acting to prevent derailing of the left and right loops of drive track 32,34 when driving sideways along inclined terrain. Also, each of the chain guides 19 is open along a track drive facing surface thereof and sized to receive and slidably support moving sections of the inwardly facing track drive track chain 66 of a respective left or right loop of track drive 32,34 as the respective left or right loop of track drive 32,34 is forced along a closed path by the respective left or right drive sprocket 48,50 as well as to remove debris, mud, and the like from the drive chain 26 as it enters and moves along chain guides 19 prior to reaching the respective left or right drive sprocket 48,50. The respective left or right drive sprocket 48,50 are each in alignment with its respective track drive track chain passageway 70, its chain guide 19 and meshed with its respective track drive track chain 66 of its respective loop of drive track 32,34 such that rotation of the respective left or right sprocket 48,50 causes a movement of the respective loop of drive track 32,34 and the respective set 22,24 of the five pairs of free-wheeling pneumatic tires 26. In this embodiment, a first tire pair 26$_{first}$ of each set 22,24 adjacent to a respective sprocket 48,50 has a smaller diameter than the remaining tire pairs 26.

Housing assembly 38 is constructed from steel tubing and has left and right multiple displacement hydraulic motors 40,42 housed within respective left and right ends 74,76 thereof. Hydraulic piping lines 80 in connection with the left and right multiple displacement hydraulic motors 40,42 extend from housing assembly 38 and into connection with the left and right drive control valving 56 and the left and right torque limiting pumps 52,54 with torque summation such that an operator can control the speed and direction of each of the left and right multiple displacement hydraulic motors 40,42. Left and right sprockets 48,50 are driven, respectively, by a left or right multiple displacement hydraulic motor 40,42.

Housing assembly 38 is moveably coupled to the support structure 20 of drive chassis 18 by spaced left and right slide members 81,82 that are each slidably supported within one of two spaced slide member receiving tubes 84,86 by a pair of resilient Buna rubber bushings 88. Each slide member receiving tube 84,86 is in rigid connection with the cab support structure 18 of drive chassis 18. Each slide member 81,82 is free to slide inwardly and outwardly with respect to its respective slide member receiving tube 84,86. In addition, because of the use of resilient bushing pairs 88, each slide member 81,82 can also move up, down, left and right in a plane perpendicular to the inward and outward motion of the slide members 81,82 so that housing assembly 38 is moveable in all three axes with respect to chassis assembly 18. If desired, sections of resilient nylon or other smooth bushing material having a hardness greater than the bushing 88 may be inserted into slide member receiving tubes 84,86 at locations above and below each slide member 81,82 so as to provide resistance to movement of the slide members 81,82 in the up and down drive directions.

Left and right track tensioner assemblies 58 each include a respective left or right double acting hydraulic cylinder assembly 90,92 mechanically coupled between the cab support structure 20 of drive chassis 18 and housing assembly 38 using multi-axis mechanical linkages or couplings 94,96 such that housing assembly 38 is also moveable in all three planes with respect to each of the left and right double acting hydraulic cylinder assemblies 90,92 thus allowing left and right double acting hydraulic cylinder assemblies 90,92 to maintain an outwardly projecting force against housing assembly 38 and causing the left and right drive sprockets 48,50 to press against and maintain tension on left and right loops of drive track 32,34. Left or right double acting hydraulic cylinder assemblies 90,92 are each in hydraulic connection with its respective tension control valving 62,63 and tensioner assembly hydraulic pump 64 via hydraulic piping 100 such that an operator can adjust the tension applied to a respective left or right loop of drive track 32,34 by the respective left and right sprocket 48,50 by operation of left and right tension control valving 62,63. In this embodiment, left and right tension control valving 62,63 is set to hold each of the left and right sprockets 48,50 against its respect left or right loop of drive track 32,34 with one-hundred-fifty pounds of force during normal operation. In addition, use of pneumatic tires 26 provides an additional track tensioning effect against the respective left or right loop of drive track 32,34 by compression of the tires 26 when rolling over obstacles such as logs, rocks and the like. Although a force of one-hundred-fifty pounds was selected in this exemplary embodiment, other magnitudes of force could also be used without departing from the spirit or the teaching of the invention taught herein.

In this embodiment left and right tension control valving 62,63; left and right drive control valving 56; tensioner assembly hydraulic pump 64; the left and right hydraulic pumps 52,54; and the hydraulic pump drive motor 65 is mounted to a slidable cab assembly 12 that slides on and is supported by cab support structure 20 of drive chassis 18.

It can be seen from the preceding description that a hydraulic track drive with hydraulic track tensioners has been provided.

It is noted that the embodiment of the hydraulic track drive with hydraulic track tensioners described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A hydraulic track drive with hydraulic track tensioners comprising:

a drive chassis including a cab support structure and left and right sets of plurality of pairs of free-wheeling pneumatic tires rotatably mounted, respectively to, left and right wheel structures of the drive chassis;

left and right loops of drive track;

a housing assembly;

left and right hydraulic motors;

left and right drive sprockets;

left and right drive hydraulic pumps;

left and right drive control valving;

left and right track tensioner assemblies;

tension control valving;

a tensioner assembly hydraulic pump;

left and right chain guides; and a pump drive motor for driving the tensioner assembly hydraulic pump and the left and right hydraulic motors;

the left and right loops of drive track each being moveably entrapped around respectively, a left or a right set of the plurality of pairs of free-wheeling pneumatic tires, a left or a right chain guide and a respective left or right drive sprocket;

each of the left and right loops of drive track having an inwardly facing track drive track chain along the entire length thereof;

each pair of free-wheeling pneumatic tires having an inner pneumatic tire and an outer pneumatic tire between which a drive track chain gap is provided;

each drive track chain gap of each pair of free-wheeling pneumatic tires being in alignment with each of the drive track chain gaps of its respective set such that a track drive track chain passageway is formed therebetween for passage of the track drive track chain of the respective loop of drive track;

each of the chain guides being supported by the drive chassis above its respective track drive track chain passageway;

each of the chain guides being open at the track drive facing surface thereof and sized to receive and slidably support sections of the inwardly facing track drive track chain of a respective left or right loop of track drive as the respective left or right loop of track drive is forced along a closed path by the respective left or right drive sprocket;

the respective left or right drive sprocket each being in alignment with its respective track drive track chain passageway and meshed with its respective track drive track chain of its respective loop of drive track such that rotation of the respective left or right sprocket causes a movement of the respective loop of drive track and the respective set of the plurality of pairs of free-wheeling pneumatic tires;

the housing assembly having the left and right hydraulic motors housed within respective left and right ends thereof, hydraulic lines in connection with the left and right hydraulic motors extending from the housing assembly and in connection with the left and right drive control valving and the left and right hydraulic pumps such that an operator can control the speed and direction of each of the left and right hydraulic motors;

the left and right sprockets being driven, respectively, by the left or right hydraulic motor;

the housing assembly being moveably coupled to the drive chassis by spaced left and right slide members each slidably supported within one of two spaced slide member receiving tubes by a pair of resilient bushings;

each slide member receiving tube being in a rigidly supported position with respect to the drive chassis;

the left and right track tensioner assemblies each including a respective left or right double acting hydraulic cylinder mechanically coupled between the drive chassis and an exterior of the housing assembly such that the housing assembly is moveable in all three planes with respect to each of the left or right double acting hydraulic cylinders;

the left or right double acting hydraulic cylinders each being in hydraulic connection with the tension control valving and the tensioner assembly hydraulic pump such that an operator can adjust the tension applied to a respective left or right loop of drive track by the respective left and right sprocket by operation of the tension control valving;

the tension control valving, the left and right drive control valving, the tensioner assembly hydraulic pump, the left and right hydraulic pumps, and the hydraulic pump drive motor being supported by the drive chassis.

\* \* \* \* \*